(12) United States Patent
Fujiwara

(10) Patent No.: US 6,822,856 B2
(45) Date of Patent: Nov. 23, 2004

(54) PORTABLE INFORMATION PROCESSING APPARATUS

(75) Inventor: Norio Fujiwara, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 8 days.

(21) Appl. No.: 10/212,067

(22) Filed: Aug. 6, 2002

(65) Prior Publication Data

US 2004/0027798 A1 Feb. 12, 2004

(51) Int. Cl.[7] .................................................. H05K 7/20
(52) U.S. Cl. ........................ 361/681; 361/704; 165/185; 174/15.2
(58) Field of Search .......................... 361/687, 704–712, 361/725, 686, 694–697, 700, 703, 692, 693; 165/58, 185, 104.33, 86, 104.32, 104.34; 174/15.1, 15.2, 52.4, 252; 395/281, 283

(56) References Cited

U.S. PATENT DOCUMENTS

| | | | |
|---|---|---|---|
| 5,768,101 A | | 6/1998 | Cheng .......................... 361/687 |
| 6,094,347 A | * | 7/2000 | Bhatia ......................... 361/695 |
| 6,166,905 A | * | 12/2000 | Oyamada et al. ............ 361/697 |
| 6,239,970 B1 | * | 5/2001 | Nakai et al. ................. 361/695 |
| 6,542,359 B2 | * | 4/2003 | Babcock et al. ............. 361/687 |
| 2001/0017764 A1 | * | 8/2001 | Nakamura et al. ........... 361/697 |
| 2002/0054495 A1 | * | 5/2002 | Natsume ...................... 362/521 |
| 2003/0058615 A1 | * | 3/2003 | Becker et al. ............... 361/687 |

FOREIGN PATENT DOCUMENTS

| | | |
|---|---|---|
| JP | 11-53063 | 2/1999 |
| JP | 11-163567 | 6/1999 |
| JP | 11-238984 | 8/1999 |

* cited by examiner

*Primary Examiner*—Hung Van Duong
(74) *Attorney, Agent, or Firm*—Wenderoth, Lind & Ponack, L.L.P.

(57) ABSTRACT

A portable information processing apparatus, which can be sophisticated with an expansion unit while it can maintain dust-proof and water-proof capacities, is provided. A main body of a note PC is made from heat conductive material and sealed. When the expansion unit is hooked up to the main body, a cooling fan provided to the expansion unit blows cooling air directly to plural fins formed on a housing of the main body, thereby cooling the main body.

20 Claims, 3 Drawing Sheets

PORTABLE INFORMATION PROCESSING APPARATUS

FIELD OF THE INVENTION

The present invention relates to portable information processing apparatuses, such as a laptop personal computer, to which an expansion unit (an external device) is mountable.

BACKGROUND OF THE INVENTION

A laptop personal computer (hereinafter called "a note PC"), to which functions can be added through an expansion unit, is often battery-powered for outdoor use where the note PC alone is used, and the note PC itself generates little heat.

On the other hand, when the expansion unit is hooked up to the note PC, a plurality of functions are added to the note PC, which is then used as a desktop personal computer. In this case, power supplied to the note PC increases in order to execute the add-on functions, so that a temperature in the note PC rises.

As such, a combination use of the note PC with the expansion unit generates greater amount of heat than a use of the note PC alone. A cooling fan is provided in the note PC to suppress temperature-rise, however, it is difficult to add components more than necessary because the note PC is a portable-oriented apparatus.

Japanese patent application non-examined publication No. H11-238984 discloses a method of preventing temperature-rise in a portable information processing apparatus, i.e., heat generated in the apparatus is conveyed to a fan equipped to an external unit via heat conductive means, so that the fan is activated. This conventional portable apparatus with the external unit disclosed in the foregoing publication is described with reference to FIG. 4.

FIG. 4 shows a lateral view of portable information processing apparatus 40 which includes main body 41 and external device 20. Main body 41 has main unit 31 and lid 32. Main unit 31 is equipped with heat-producing components (not shown) such as semi-conductors, printed circuit boards, rectifiers. Heat generated from those components travels to heat-dissipating bottom plate 34. External device 20 has metallic housing 21 in which cooling mechanism 22, comprising a cooling fan and heat sink, is situated opposite to heat-dissipating bottom plate 34.

In the vicinity of cooling mechanism 22, silicone rubber as heat conductive means is placed, and temperature sensor 23 is also disposed. Pedestal 24 receives main body 41 horizontally.

An operation of the portable information processing apparatus discussed above is described hereinafter. Note PC 40 is connected to the commercial current and the note PC is booted together with the external device. In this status, the semiconductors and other components produce heat, which is conveyed to the vicinity of cooling mechanism 22 (e.g. the fan) via heat dissipating bottom plate 34 and silicone rubber 30.

In due course, temperature sensor 23 detects silicone rubber 30 reaches a given temperature, then temperature control means activates fan 22, which blows air to silicone rubber 30 to cool. This coldness of silicone rubber 30 is transferred to the semiconductors and other components in main unit 31 thereby the semiconductors and other components are cooled.

As such, a cooling fan equipped to an expansion unit allows a note PC to maintain its portability and yet to work a plurality of add-on functions. Recently, note PCs alone are frequently used outdoor, so that the note PCs can be used in versatile conditions, which requires higher reliability in a worse condition. For instance, a note PC alone is desirably dust-proof as well as water proof and yet regulates temperature-rise therein. Further, the note PC carries out add-on functions through an expansion unit, and regulates heat generated from the sophisticated PC. However, in the prior art discussed above, the fan provided for the external device cools the main body indirectly using the heat conductive means such as the silicone rubber. Thus inside of the main body cannot be cooled efficiently.

SUMMARY OF THE INVENTION

The present invention addresses the problem discussed above and aims to provide a portable information processing apparatus that can maintain its dust-proof and water-proof capacities and yet regulate heat generated from a note PC using add-on functions through an external device.

The portable information processing apparatus of the present invention comprises the following elements:
a main body; and
an external device to be coupled with the main body externally for providing add-on functions and including a cooling fan that cools parts of a housing of the main body when the external device is coupled with the main body.

DETAILED DESCRIPTION OF THE EXEMPLARY EMBODIMENTS

Exemplary embodiments of the present invention are demonstrated hereinafter with reference to the accompanying drawings. Each drawing is a schematic one and does not indicate exact positional relations or dimensions.

Exemplary Embodiment 1

Figure 1A:
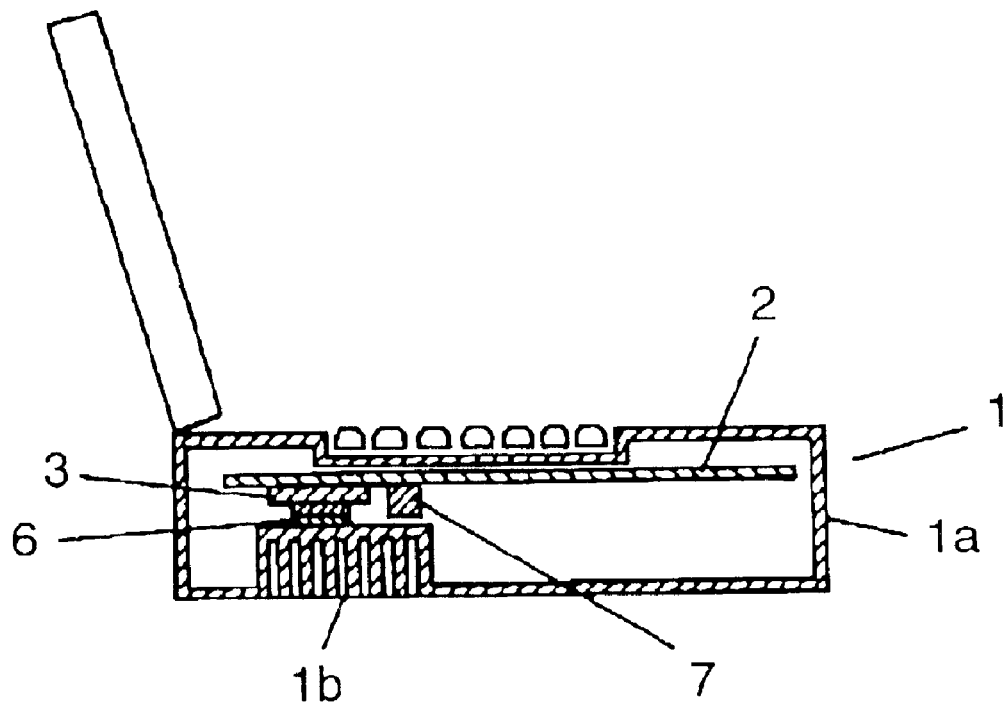
FIG. 1A shows a sectional view of a note PC in accordance with a first exemplary embodiment of the present invention.
Figure 1B:
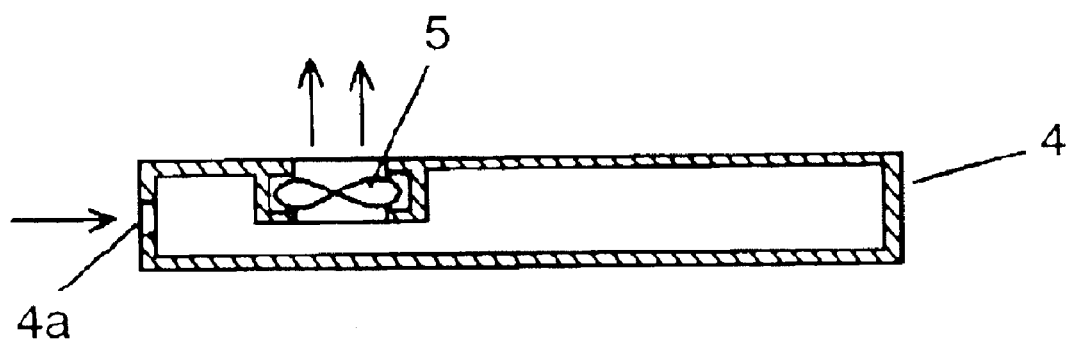
FIG. 1B shows a sectional view of an expansion unit in accordance with the first exemplary embodiment of the present invention.

As shown in FIG. 1A, in main body 1 of the note PC, CPU 3 which produces a great amount of heat and other components are mounted to circuit board 2. In expansion unit 4 shown in FIG. 1B cooling fan 5 is disposed to an upper side, and opening 4a is formed on a lateral face.

Housing 1a of main body 1 is made of an alloy of aluminum, an alloy of magnesium or the like considering heat dissipation. The alloy of magnesium is preferable because it can maintain rigidity while it can be thinned. Work of forming magnesium alloy has been improved, so that the alloy can be finished smooth on surface. Thus expansion unit 4 can be brought into contact with housing 1a solidly. A plurality of fins 1b are provided to a lower plate of housing 1a so that fins 1b can face cooling fan 5 of expansion unit 4.

The components including CPU 3 are thermally coupled with housing 1a via heat dissipating member 6 made of heat conductive elastomer. Further temperature sensor 7 that senses a temperature inside main body 1 is disposed.

An operation of the portable information processing apparatus structured above is demonstrated hereinafter. When a note PC is used alone, a cooling fan (not shown) provided inside of the note PC cools CPU 3 and other components. However, when add-on functions are used, or the note PC becomes more sophisticated by hooking up expansion unit 4 to main body 1, CPU 3 and other components produce much more amount of heat.

Temperature sensor 7 detects a temperature inside main body 1 of the note PC. When a detected temperature exceeds a predetermined temperature, cooling fan 5 of expansion unit 4 coupled to main body 1 starts spinning, thereby producing an air flow. To be more specific, outer air of expansion unit 4 is sucked from opening 4a formed on the lateral plate and exhausted to the outside through cooling fan 5. The exhausted air is blown to the plurality of fins 1b formed on housing 1a at the place facing cooling fan 5.

Since housing 1a of main body 1 is made from metal such as magnesium alloy, housing 1a conveys heat well, and the plurality of fins 1b enlarges surface area receiving the cool wind, so that housing 1a starts being cooled from fins 1b. Accordingly heat dissipating member 6 thermally coupled with housing 1a is also cooled. When a temperature in main body 1 lowers down to the predetermined temperature, cooling fan 5 stop spinning. This structure does not involve constant operation of cooling fan 5 during the connection of expansion unit 4 to main body 1, but it involves an operation of cooling fan 5 only when a temperature in main body 1 exceeds the given temperature due to a large amount of heat from CPU 3 and other components. Cooling fan 5 does not work while CPU 3 and other components generate smaller amount of heat and thus a temperature in main body 1 is lower than the given temperature. Cooling fan 5 can be controlled not only by switching its rotation on and off but also by controlling the number of rotations responsive to the temperature, so that fan 5 is effectively operated to reduce noises and saving power.

As such, cooling fan 5 provided to expansion unit 4 blows outside air directly to the plurality of fins 1b formed on housing 1a of main body 1, thereby cooling the inside of main body 1 efficiently. Further, since housing 1a is made from metal, heat is dissipated not only from fins 1b but also from the overall housing.

This method does not involve blowing air into the inside of main body 1 of the note PC, so that an opening on housing 1a is not needed. Main body 1 thus can be completely sealed for water-proof and dust-proof purposes.

Figure 2:
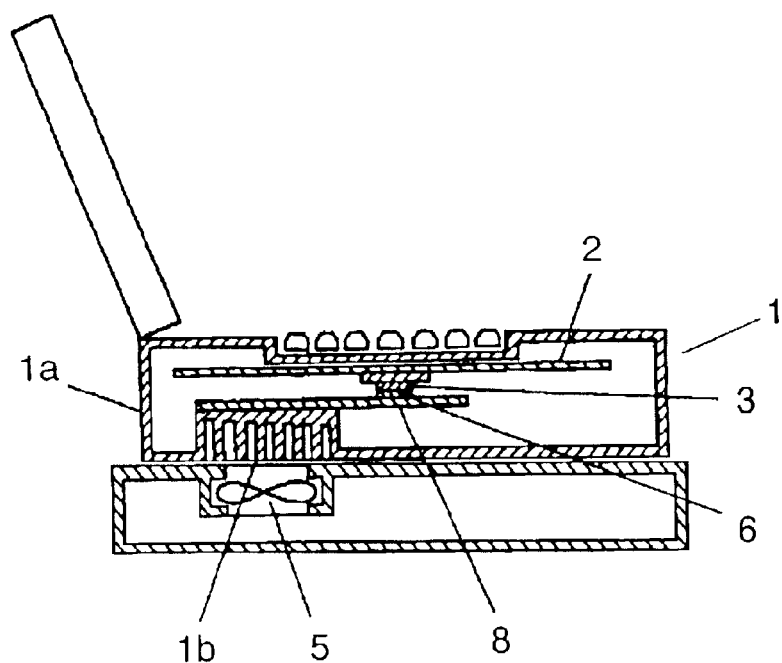
FIG. 2 shows a sectional view illustrating a combination status of the expansion unit hooked up and the note PC in accordance with the first exemplary embodiment.

In this embodiment, heat conductive elastomer is used as heat dissipating member 6, however; any shock absorbing material that conveys heat well can be used, such as heat conductive silicone compound and the like. In this embodiment, heat dissipating member 6 is disposed between housing 1a and CPU 3 together with other components, however; heat sink 8 can be placed between housing 1a and heat dissipating member 6 as shown in FIG. 2. Temperature sensor 7 can be any component such as a thermistor, a diode, or a resistor as long as it can monitor a temperature of the housing.

Exemplary Embodiment 2

Figure 3:
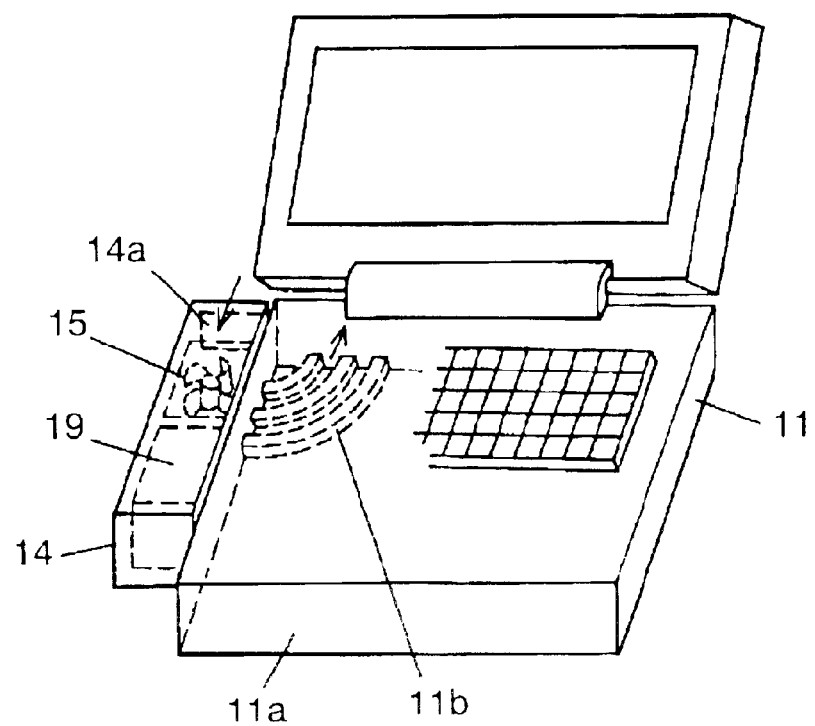
FIG. 3 shows a perspective view illustrating a status where an AC adapter is connected to a note PC in accordance with a second exemplary embodiment of the present invention.
Figure 4:
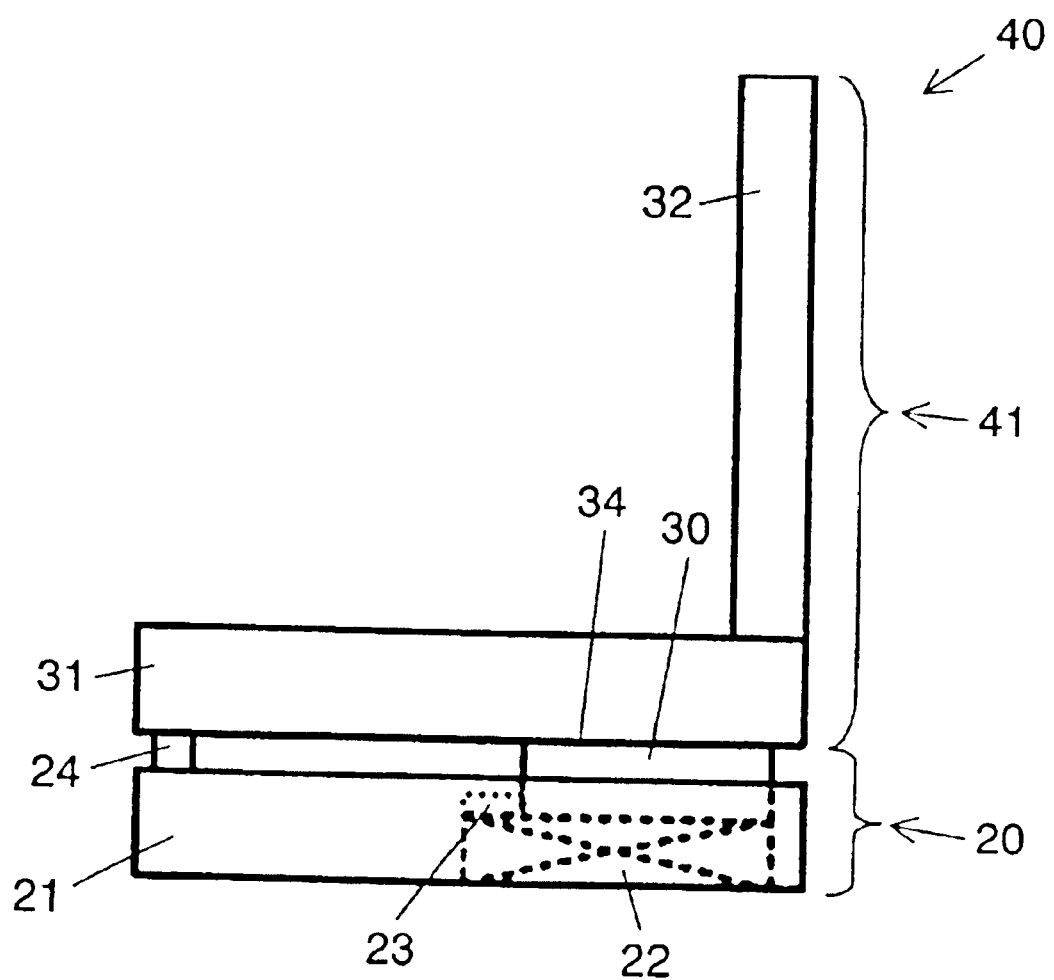
FIG. 4 shows a lateral view illustrating a status where a conventional note PC is coupled with an external device.

In FIG. 3, an inside structure of main body 11 of a note PC is similar to that in the first embodiment. AC adapter 14 as an external device has AC adapter function part 19, cooling fan 15 therein, and opening 14a on its lateral face. A plurality of concentric fins 11b are formed on a lower plate of housing 11a at a rear corner, so that concentric fins 11b run from a lateral plate to a rear plate of housing 11a. First ends of fins 11b on the lateral plate face cooling fan 15 in AC adapter 14. An operation of the foregoing portable information processing apparatus in accordance with the second embodiment is demonstrated hereinafter.

AC adapter 14 is connected to main body 11 of the note PC so that the note PC can work more sophisticatedly, thereby changing the PC from battery-powered to ac-powered. Upon the connection, cooling fan 15 of AC adapter 14 starts spinning, and generates an air flow. Air outside AC adapter 14 is sucked from opening 14a as shown with an arrow mark and exhausted through cooling fan 15. The exhausted air blows to plural fins 11b via the lateral plate of main body 11 and blows out from the rear plate. At this time, this part of housing 11a is cooled, accordingly, inside heat-producing components (not shown) thermally coupled to housing 11a are also cooled.

As such, cooling fan 15 disposed in AC adapter 14 blows outside air to plural fins 11b formed on housing 11a, thereby cooling the inside of main body 11 of the note PC efficiently. The housing is made from metal such as magnesium alloy, thereby conveying and dissipating heat well.

As in the first embodiment, the second embodiment does not involve blowing air into the main body 11, so that an opening is not needed to housing 11a. As a result, main body 11 of the note PC can be completely sealed for water-proof and dust-proof purposes. Further, since housing is finished smooth on surfaces, it can be brought into contact with the external device solidly. Accordingly, this structure can eliminate heat conductive means such as silicone rubber which is supposed to couple main body 11 with the external device.

As discussed above, according to the present invention, when a portable information processing apparatus is used together with an external device hooked up to the apparatus, a cooling fan is equipped to the external device. Then the cooling fan blows cooling wind to parts of a housing of a main body of the apparatus. This structure allows to cool a CPU and other heat-producing components in the main body via the housing efficiently. Further, the housing does not need an opening, so that it can maintain dust-proof and water-proof capacities and yet regulate heat production. As a result, this structure advantageously allows users to use this portable information processing apparatus more sophisticatedly.

What is claimed is:

1. A portable information processing apparatus comprising:

a main body having a housing with an interior in which an electronic member for information processing is accommodated, said main body including heat-exchange fins recessed into said housing and exposed to an exterior of said housing; and an external device arranged to be attached to said main body for providing an add-on function;

wherein said external device includes a cooling fan arranged to directly cool said heat-exchange fins of said main body when said external device is attached to said main body; and wherein said housing is sealed such that, when said external device is attached to said main body and said cooling fan is directly cooling said heat-exchange fins of said main body, cooling air from said fan does not enter into said interior of said housing.

2. The portable information processing apparatus of claim 1, further comprising a temperature sensor for detecting a temperature of said main body, wherein when said external device is attached to said main body and when a detected temperature exceeds a predetermined temperature, the cooling fan of said external device is activated.

3. The portable information processing apparatus of claim 1, wherein the housing of said main body is made of heat conductive material.

4. The portable information processing apparatus of claim 1, wherein said electronic member for information processing constitutes a heat producing component and is placed inside the main body at a location so as to face the cooling fan of said external device when said external device is attached to said main body.

5. The portable information processing apparatus of claim 1, wherein a heat sink is placed solidly inside the main body at a location so as to face the cooling fan of said external device when said external device is attached to said main body.

6. The portable information processing apparatus of claim 1, wherein said external device has a casing with a cooling-air intake opening and a cooling-air outlet opening formed therein, and when said external device is attached to said main body, said cooling fan is operable to draw cooling air into said casing through said cooling-air intake opening and expel the cooling-air from said casing through said cooling-air outlet opening toward said part of said housing of said main body.

7. The portable information processing apparatus of claim 1, further comprising a heat dissipating member provided between said electronic member for information processing and said housing to conductively thermally couple said electronic member for information processing to said housing.

8. The portable information processing apparatus of claim 2, wherein when said external device is attached to said main body and when a detected temperature is lower than a predetermined temperature, the cooling fan of said external device is deactivated.

9. The portable information processing apparatus of claim 3, wherein the housing of said main body is made from an alloy of magnesium.

10. The portable information processing apparatus of claim 3, wherein said heat-exchange fins are provided to the housing of said main body at a location so as to face the cooling fan of said external device when said external device is attached to said main body.

11. A portable information processing apparatus comprising:

a main body having a housing with an interior in which an electronic member for information processing is accommodated, said main body including heat-exchange fins exposed to an exterior of said housing; and an external device arranged to be attached to said main body for providing an add-on function;

wherein said external device includes a cooling fan arranged to directly cool said heat-exchange fins of said main body when said external device is attached to said main body;

wherein said electronic member for information processing is conductively thermally coupled to said heat-exchange fins; and wherein said housing is sealed such that, when said external device is attached to said main body and said cooling fan is directly cooling said heat-exchange fins of said main body, cooling air from said fan does not enter into said interior of said housing.

12. The portable information processing apparatus of claim 11, further comprising a temperature sensor for detecting a temperature of said main body, wherein when said external device is attached to said main body and when a detected temperature exceeds a predetermined temperature, the cooling fan of said external device is activated.

13. The portable information processing apparatus of claim 11, wherein the housing of said main body is made of heat conductive material.

14. The portable information processing apparatus of claim 11, wherein said electronic member for information processing constitutes a heat producing component and is placed inside the main body at a location so as to face the cooling fan of said external device when said external device is attached to said main body.

15. The portable information processing apparatus of claim 11, wherein a heat sink is placed solidly inside the main body at a location so as to face the cooling fan of said external device when said external device is attached to said main body.

16. The portable information processing apparatus of claim 11, wherein said external device has a casing with a cooling-air intake opening and a cooling-air outlet opening formed therein, and when said external device is attached to said main body, said cooling fan is operable to draw cooling air into said casing through said cooling-air intake opening and expel the cooling-air from said casing through said cooling-air outlet opening toward said part of said housing of said main body.

17. The portable information processing apparatus of claim 11, further comprising a heat dissipating member provided between said electronic member for information processing and said housing to conductively thermally couple said electronic member for information processing to said housing.

18. The portable information processing apparatus of claim 12, wherein when said external device is attached to said main body and when a detected temperature is lower than a predetermined temperature, the cooling fan of said external device is deactivated.

19. The portable information processing apparatus of claim 13, wherein the housing of said main body is made from an alloy of magnesium.

20. The portable information processing apparatus of claim 13, wherein said heat-exchange fins are provided to the housing of said main body at a location so as to face the cooling fan of said external device when said external device is attached to said main body.

* * * * *